United States Patent
Sawal et al.

(10) Patent No.: US 12,443,500 B1
(45) Date of Patent: Oct. 14, 2025

(54) ANOMALY DETECTION FOR A MICROSERVICES PLATFORM

(71) Applicant: Dell Products L.P., Round Rock, TX (US)

(72) Inventors: Vinay Sawal, Fremont, CA (US); Jason Liu, Wellesley, MA (US); Amihai Savir, Newton, MA (US); Deepak Krishna, Newcastle, WA (US); Alice Jiang, Waltham, MA (US); Jordan Leventis, College Station, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 28 days.

(21) Appl. No.: 18/627,626

(22) Filed: Apr. 5, 2024

(51) Int. Cl.
  *G06F 11/30* (2006.01)
  *G06F 11/07* (2006.01)
  *H04L 67/02* (2022.01)

(52) U.S. Cl.
  CPC ........ *G06F 11/3006* (2013.01); *G06F 11/079* (2013.01); *H04L 67/02* (2013.01)

(58) Field of Classification Search
  CPC ..... G06F 11/3006; G06F 11/079; H04L 67/02
  USPC ........................................................ 709/224
  See application file for complete search history.

(56) References Cited

U.S. PATENT DOCUMENTS

| | | | | |
|---|---|---|---|---|
| 10,528,450 | B2 * | 1/2020 | Hassan | G06F 11/3616 |
| 11,921,618 | B2 * | 3/2024 | Li | G06F 11/3636 |
| 11,947,439 | B2 * | 4/2024 | Kang | G06F 11/3466 |
| 12,019,502 | B2 * | 6/2024 | Mohanty | G06N 20/00 |
| 12,131,175 | B2 * | 10/2024 | Rangarajan | G06F 8/61 |
| 12,200,073 | B1 * | 1/2025 | Li | H04L 67/02 |
| 2020/0401457 | A1 * | 12/2020 | Singhal | G06F 8/60 |
| 2022/0103437 | A1 * | 3/2022 | Palladino | H04L 47/805 |
| 2024/0020214 | A1 * | 1/2024 | Jha | G06F 11/302 |
| 2024/0248830 | A1 * | 7/2024 | Shpilyuck | G06F 11/3006 |
| 2024/0303124 | A1 * | 9/2024 | White | G06F 9/505 |

OTHER PUBLICATIONS

"Static Program Analysis", Wikipedia, online available at <https://en.wikipedia.org/wiki/Static_program_analysis>, retrieved on May 29, 2024, 5 pages.

Moha et al., "DECOR: A Method for the Specification and Detection of Code and Design Smells", IEEE Transactions on Software Engineering, vol. 36, No. 1, Jan./Feb. 2010, pp. 20-36.

Ying et al., "Neural Subgraph Matching" arXiv:2007.03092v2 [cs.LG] Oct. 27, 2020 (16 pages).

* cited by examiner

*Primary Examiner* — Sargon N Nano
(74) *Attorney, Agent, or Firm* — Amin, Turocy & Watson, LLP

(57) ABSTRACT

Architectures and techniques are described that can generate or receive a dependency graph of a microservices platform. The dependency graph can be constructed based on run time operation of microservices such that the nodes of the graph can represent microservices and the edges can represent the interactions during run time. The dependency graph along with an anomaly pattern can be embedded into an embedding space, and based on an examination of the embedding space, it can be determined whether the anomaly pattern exists in the dependency graph.

20 Claims, 12 Drawing Sheets

ANOMALY DETECTION FOR A MICROSERVICES PLATFORM

BACKGROUND

A microservices platform is a software architecture and set of tools designed to support the development, deployment, and management of microservices-based applications. Microservices architecture(s) generally enable an approach to software development where applications are composed of loosely coupled, independently deployable services, each responsible for a specific business function. Microservices platforms can provide developers with the tools and infrastructure needed to build, deploy, and operate microservices-based applications at scale. The platform can help organizations embrace the principles of microservices architecture and leverage associated benefits, such as agility, scalability, and resilience, to deliver innovative and reliable software solutions.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
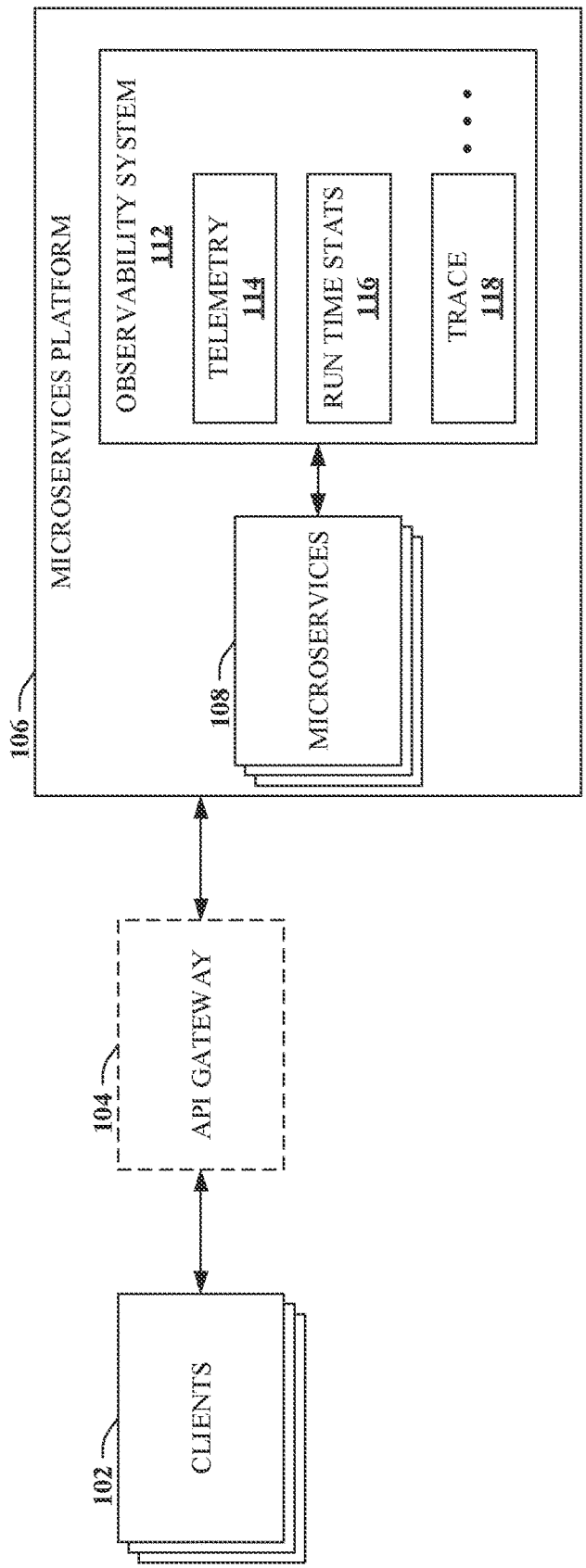
FIG. 1 depicts a schematic block diagram 100 illustrating certain functionality or operation of a microservices platform in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

To provide additional context, consider an example architecture associated with a microservices platform, illustrated in connection with FIG. 1. FIG. 1 depicts a schematic block diagram 100 illustrating certain functionality or operation of a microservices platform in accordance with certain embodiments of this disclosure.

Microservices platform 106 can have deployed thereon microservices 108. Microservices 108 can communicate with one another via well-defined application programming interfaces (APIs), such as representational state transfer (REST) APIs, also referred to as RESTful APIs. Each microservice 108 can represent a loosely coupled, independently deployable, self-contained service that serves a specific function or capability. Microservices 108 can differ from traditional monolithic applications due to this architectural design. For example, an application can make API calls to one or more microservices 108 instead of coding the function or capability into the application in a monolithic way. Hence, a given microservice 108 can provide a dedicated function or capability to many different applications or other microservices 108 in a more resilient and scalable manner.

For example, clients 102 that execute applications can make calls to microservices 108 of microservices platform 106. Optionally, any such communication can be via API gateway 104. API gateway 104 can be a server that acts as a single entry point for clients 102 to access multiple microservices 108. API gateway 104 can serve as a reverse proxy that routes requests from clients 102 to the appropriate microservices 108, abstracting away potential complexities of the underlying microservices architecture.

It is appreciated that in the context of this disclosure, microservices platform 106 can be any suitable platform that provides access to microservices 108. Such can be any suitable cloud-based services platform, a containerized workflow platform or container orchestration platform such as Kubernetes or another system or platform.

As indicated in the background section, Microservices platforms (e.g., microservices platform 106) can provide developers with the tools and infrastructure needed to build, deploy, and operate microservices-based applications at scale. In order to meet these goals, it can be important to monitor the health of microservices platform 106 as well as the operation of the microservices 108 deployed thereon, which can be provided by health monitoring system 112.

As one example, observability system 112 can comprise a group of applications or services such as, for example, applications or services that are devoted to telemetry 114, run time stats 116, trace operations 118, and so on. While more specifics regarding observability (e.g., provided by observability systems 112) are provided in connection with FIG. 2, the following can be considered.

In accordance with the disclosed subject matter, telemetry 112 can relate to any suitable process of collecting, monitoring, and analyzing data about the behavior, performance, and health of microservices and the underlying infrastructure. Telemetry data can provide insights into how microservices 108 are performing in real-time, allowing developers and operations teams to identify issues, optimize performance, and ensure reliability.

In some embodiments, such can include concepts of run time stats 116 and/or trace operations 118. Run time stats 116 can relate to various metrics or indicators from microservices 108, such as response times, error rates, throughput, CPU and memory usage, network traffic and so forth. These metrics or run time stats 116 can provide visibility into the performance or behavior of microservices 108 and can help identify potential issues or bottlenecks. Run time stats 116 can be collected by elements of telemetry 114.

With regard to trace operations 118, tracing can relate to a process of tracking or recording the flow of requests as the requests propagate through multiple microservices 108 in a distributed system. In some embodiments, tracing can allow observability systems 112 to support distributed tracing, which enables developers to trace and analyze the flow of requests across multiple microservices 108 in a distributed system. Distributed tracing can enable developers or operations teams to understand the interactions and dependencies between different microservices, identify performance bottlenecks, diagnose issues that may occur during request processing and so forth.

Figure 2:
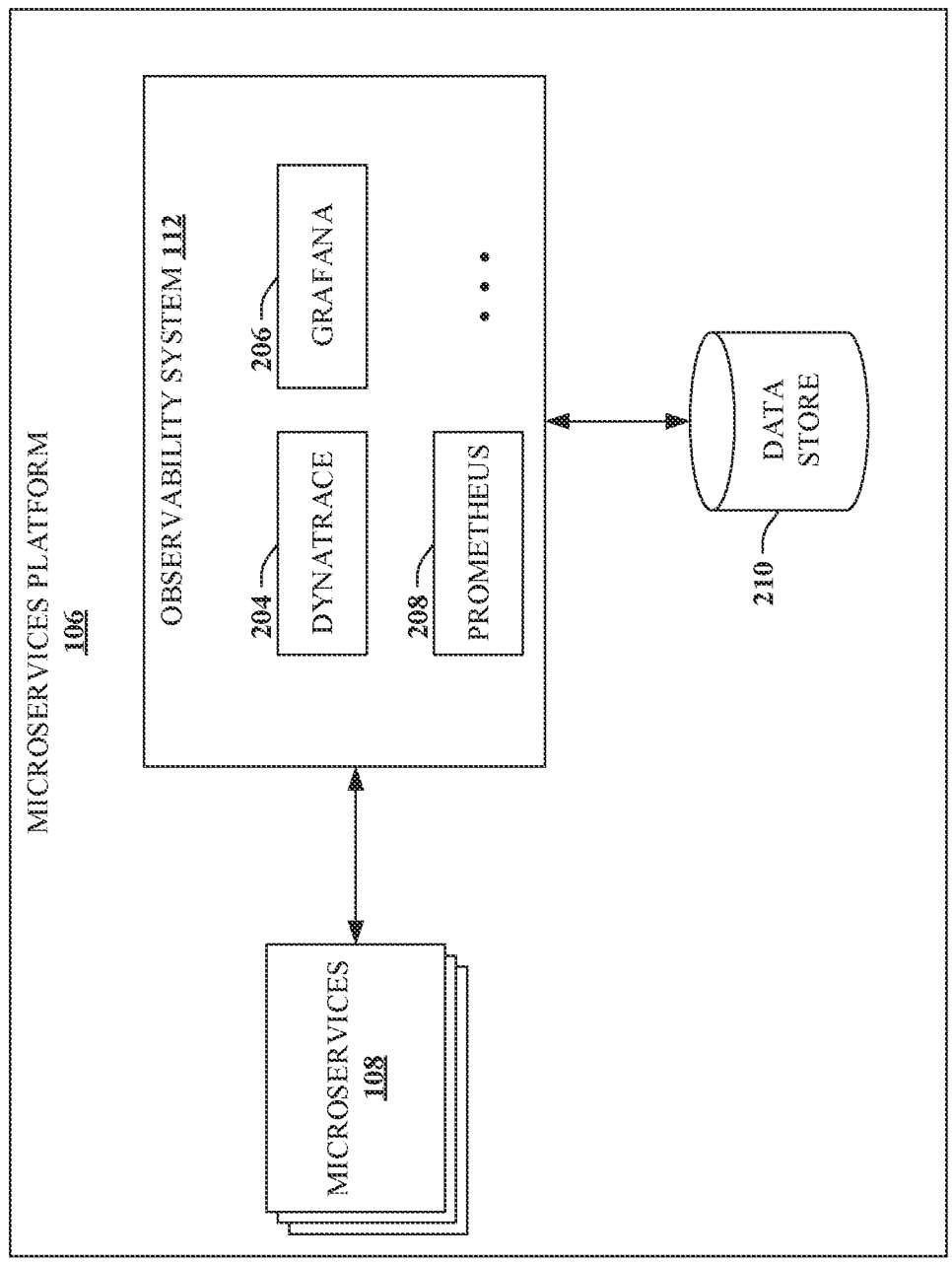
FIG. 2 depicts a schematic block diagram illustrating specific examples of applications or services that can be employed via an observability system in accordance with certain embodiments of this disclosure.

Referring now to FIG. 2, a schematic block diagram 200 is depicted illustrating specific examples of applications or services that can be employed via an observability system 112 in accordance with certain embodiments of this disclosure.

As introduced above, typically, observability systems 112 can leverage specific data classes relating to logs, metrics, traces and so forth. Logs and traces can be utilized for collecting telemetry data while metrics can be used for measurements or comparisons. While a given microservices platform 106 may potentially use any one or more observability systems 112, some representative examples can be Dynatrace 204, Grafana 206, or Prometheus 208. Other examples, of course, can exist.

Dynatrace 204 can be indicative of a Dynatrace product or service comprising a comprehensive observability platform that provides monitoring, analytics, and intelligence for cloud-native environments and applications. The Dynatrace product can be designed to help organizations gain insights into the performance, availability, and health of their applications and infrastructure in real-time. For example, an agent can be injected into an application or microservice 108 in order to monitor metrics or the state of the microservice 108. The Dynatrace product can further comprise visualization functions, which can be leveraged to generate microservices dashboards 114.

Grafana 206 can be indicative of a Grafana product or service. Grafana is an open-source platform for monitoring, visualization, and analytics, which can be utilized in connection with microservices 108. Grafana is commonly used to visualize time series data from various sources, including monitoring systems, databases, and applications.

Prometheus 208 can be indicative of a Prometheus product or service. Prometheus is an open-source monitoring and alerting toolkit designed for monitoring the performance and health of systems and applications such as, e.g., microservices 108. Prometheus is widely used for collecting, storing, querying, and visualizing time-series data. Certain other observability products or services might also be used by a given microservices platform 106 and/or the developers of microservices 108 and might also be representative.

Other examples can exist, and it is appreciated that any suitable observability system 112 can be used by microservices platform 106. Further, any data collected by telemetry system 114, run time stats 116, trace operations 118, or any other suitable observability system 112 can be stored to data store 210. Where such data can be examined in order to improve the operation of microservices platform 106.

Unfortunately, in the context of a given microservices platform 106, certain design anomalies (or other anomalies) can exist in the context of a given microservices architecture (e.g., microservices platform 106). Design anomalies can refer to deviations from best practices or architectural principles that can lead to inefficiencies, complexities, or issues in the system's design and implementation. These anomalies may arise due to various factors, including architectural decisions, communication patterns, service boundaries, or scalability considerations.

In some cases, the aforementioned anomaly can be an anti-pattern, which is further detailed in connection with FIG. 4. An anti-pattern (e.g., anti-pattern 417), as used herein, in the context of microservices platform 106 or software development in general can refer to a common solution or approach that appears to be beneficial but, in practice, leads to negative consequences, such as poor performance, maintainability issues, or inefficiencies. Anti-patterns often arise from well-intentioned but misguided attempts to solve a problem or address a particular requirement.

Even with data collected from observability systems 112 and/or stored in data store 210, certain anti-patterns or other anomalies can be extremely difficult to identify. Previous approaches to identifying design anomalies or anti-patterns have been directed to analyzing source code and employing a rules-based technique to identify expected symptoms of anti-patterns.

However, in modern microservices platforms or another development platform, the software codebase can be extensive, comprising numerous repositories distributed across various product groups or even subsidiary companies, each potentially using different version control providers. This complexity makes it impractical to obtain access to all source code artifacts. Additionally, no centralized service registry may be available for discovering services in such an ecosystem.

Due to these challenges, conducting a static analysis of the source code is not viable outside of a few specific implementations. Furthermore, static analysis of source code generally cannot provide a comprehensive overview of the situation, and may not be capable of identifying certain anomalies and/or anti-patterns.

Accordingly, there is a need to devise a dynamic analysis methodology or technique that can have the capability to analyze and identify anti-patterns or other anomalies in the deployed micro-service architecture such as microservices platform 106. Distinct from the previous approaches that analyze source code, the disclosed techniques relate to analyzing the operation of microservices 108 at run time. Such can advantageously leverage existing observability systems 112 to extend and/or leverage those systems to provide elements of anomaly detection, which is further detailed below.

EXAMPLE SYSTEMS

Figure 3:
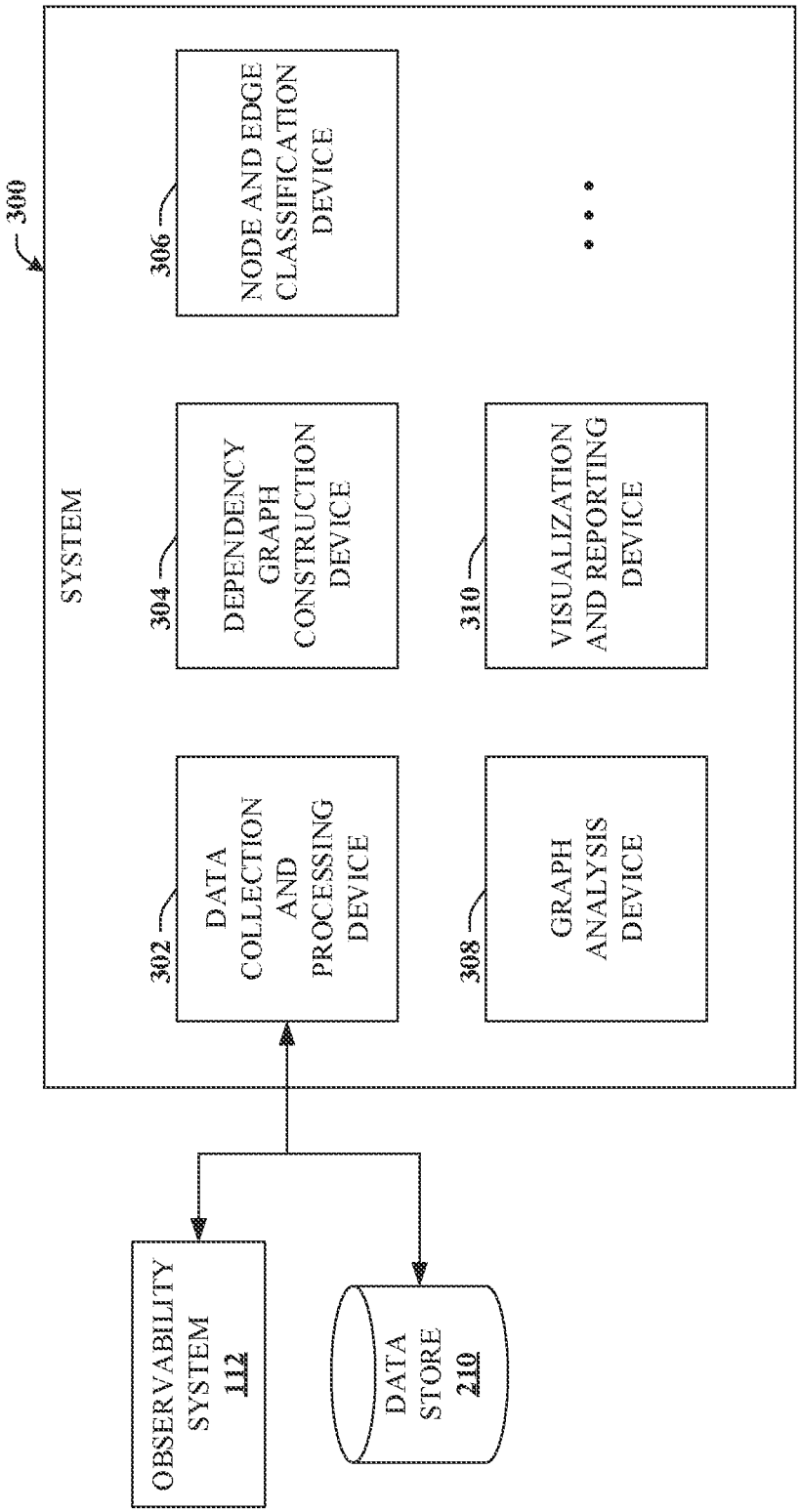
FIG. 3 depicts a schematic block diagram illustrating an example system that can leverage an observability system and/or associated data collected and stored in the data store to identify anomalies in accordance with certain embodiments of this disclosure.

Turning now to FIG. 3, an example schematic block diagram is depicted illustrating an example system 300 that can leverage an observability system 112 and/or associated data collected and stored in the data store 210 to identify anomalies in accordance with certain embodiments of this disclosure. As introduced above, instead of relying on source code analysis for anomaly detection, system 300 can be employed to identify anomalies within a given software platform such as microservices platform 106 during execution of the software components (e.g., microservices 108.

To these and other related ends, system 300 can generate a dynamic dependency map based on the run time execution of microservices 108 on microservices platform 106. In some embodiments, the dynamic dependency map can be generated based on data from observability systems 112 and/or data store 210. System 300 can then leverage the dynamic dependency map to construct a dependency graph, which is further detailed in connection with FIG. 4. In essence, while previous research has primarily focused on scrutinizing the static aspects of source code in an attempt to uncover anti-patterns, the disclosed techniques can shift the emphasis to dynamic execution traces.

The disclosed techniques can provide a more comprehensive view of how software systems (e.g., microservices platform 106) operate in real-world scenarios over previous approaches. For example, by analyzing various metrics/traces or other input data, certain insights into how various components of a system interact during runtime can be identified. This dynamic perspective enables improved detection of anti-patterns that may not be apparent from static code analysis alone. Hence, the disclosed techniques represent a significant technological improvement in that, by analyzing data from software component execution, anti-patterns or other anomalies can be more readily identified.

Furthermore, the disclosed techniques are inherently less reliant on the availability of complete and accurate source code. Hence, the disclosed techniques can be applicable in scenarios where access to source code might be limited or when dealing with complex or legacy systems. For instance, dynamic metrics can be generated from the running software without requiring access to the underlying codebase, thereby enhancing the versatility of the disclosed techniques. Such represents another technological improvement because the disclosed approach to anomaly detection can be used even in scenarios in which adequate access to source code is not available.

In more detail, system 300 can comprise data collection and processing device 302. Data collection and processing device 302 can perform operations relating to gathering comprehensive data sets related to microservices 108. Such can include metrics, traces, run time data, information about service dependencies, and so forth. Such data collection can leverage observability systems 112 or any suitable system that can provide telemetry 114 operations, run time stats 116 information, trace operations 118 and so on. Any suitable observability application or service can be utilized.

System 300 can comprise dependency graph construction device 304. Dependency graph construction device 304 can be configured to create a dependency graph. As noted previously, the graph can be constructed based on the dynamic dependency map generated based on run time execution of microservices 108 on microservices platform 106. The dependency graph can be constructed such that individual microservices 108 are represented in the dependency graph as nodes and their interactions (e.g., API calls/responses) are represented as edges of the dependency graph.

System 300 can further comprise node and edge classification device 306, that can be configured to classify nodes and edges of the dependency graph. For example, once the dependency graph is constructed, various graph spatial processes can be applied to analyze the relationships between microservices 108. Additional detail relating to graph spatial analysis can be found with reference to FIG. 6B.

System 300 can further comprise graph analysis device 308. Given that the dependency graph has been constructed (e.g., by dependency graph construction device 304) and the classification of nodes and edges is in place (e.g., by node and edge classification device 306), graph analysis device 308 can analyze the dependency graph in order to identify anomalies and/or anti-patterns within the associated software platform (e.g., microservices platform 106). Identification of anomalies can comprise graph traversal procedures that traverse the dependency graph in order to pinpoint these problematic patterns. Additional detail relating to anti-patterns can be found in connection with FIGS. 4, 5A, and 5B.

System 300 can also comprise visualization and reporting device 310. Visualization and reporting device 310 can be configured to generate and/or present results of the anomaly or anti-pattern identification procedures (e.g., performed by graph analysis device 308). Visualization can aid in presenting the identified anomalies in a comprehensible manner. Generating reports can allow stakeholders or other suitable entities to gain insights into the health and structure of microservices platform 106.

System 300 can comprise other suitable components, but the illustrated elements (e.g., device 302-310) are representative. System 300 can provide a rigorous means to ensure the reliability and efficiency of microservices platform 106. In that regard, system 300 can allow for proactive identification and mitigation of issues (e.g., anomalies or anti-patterns) that could impact the performance or maintainability of the microservices platform 106 or other infrastructure.

Figure 4:
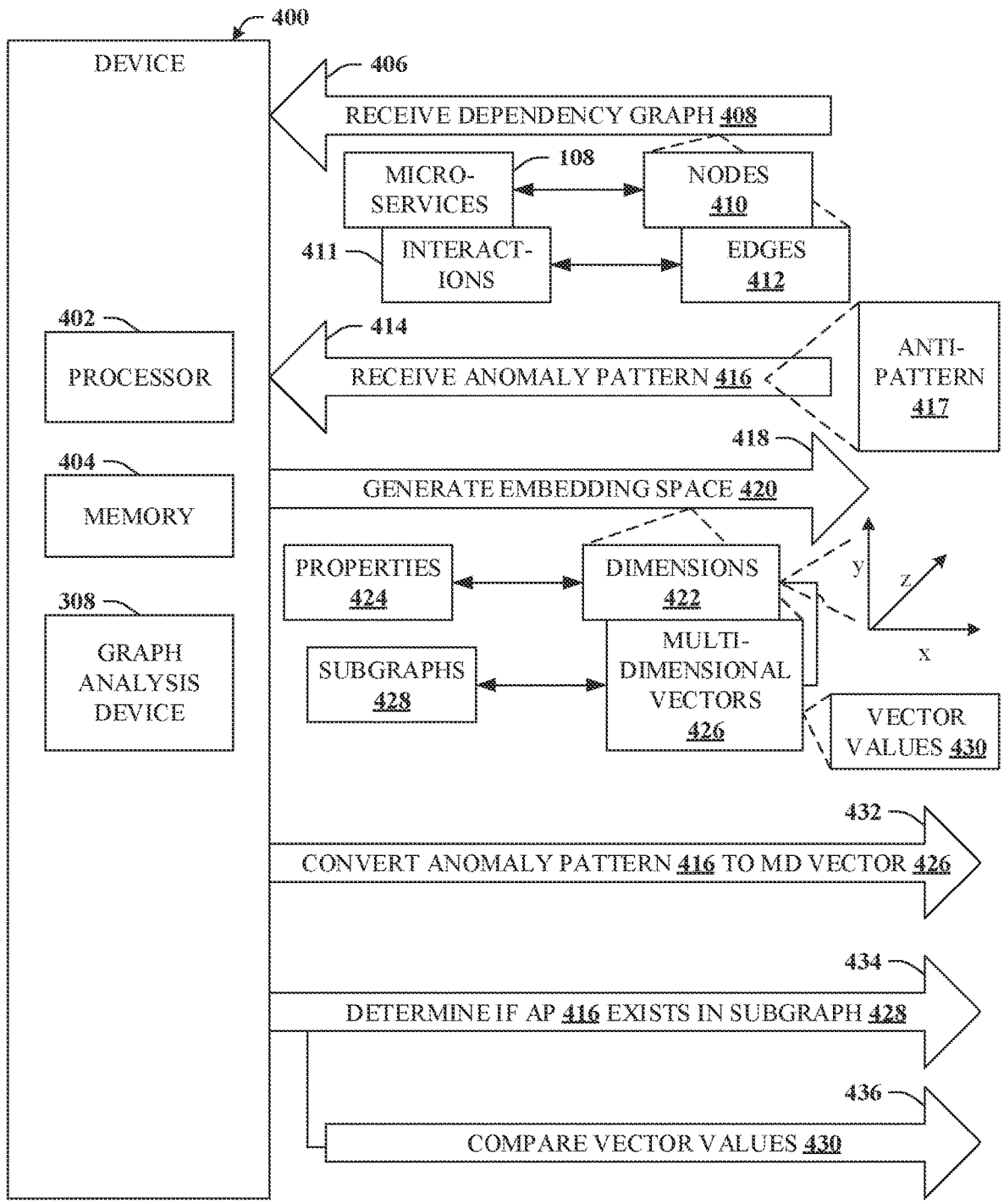
FIG. 4 depicts a schematic block diagram illustrating an example device that can analyze a dependency graph in order to identify an anomaly in accordance with certain embodiments of this disclosure.

With reference now to FIG. 4, a schematic block diagram is depicted illustrating an example device 400 that can analyze a dependency graph in order to identify an anomaly in accordance with certain embodiments of this disclosure. In some embodiments, device 400 can be communicatively coupled to a microservices platform such as microservices platform 106. In some embodiments, device 400 can include all or a portion of the elements detailed in connection with FIG. 3. For example, in the illustrated embodiment, device 400 comprises graph analysis device 308, but it is understood that device 400 can comprise other suitable devices depending on a particular application or the desired implementation.

Device 400 can comprise a processor 402 that, potentially along with graph analysis device 308, can be specifically configured to perform functions associated with identifying anomalies on a microservices platform such as microservices platform 106. Device 400 can also comprise memory 404 that stores executable instructions that, when executed by processor 402, can facilitate performance of operations. Processor 402 can be a hardware processor having structural elements known to exist in connection with processing units or circuits, with various operations of processor 402 being represented by functional elements shown in the drawings herein that can require special-purpose instructions, for example, stored in memory 404 and/or graph analysis device 308. Along with these special-purpose instructions, processor 402 and/or graph analysis device 308 can be a special-purpose device. Further examples of the memory 404 and processor 402 can be found with reference to FIG. 12. It is to be appreciated that device 400 or computer 1202 can represent a server device or a client device of a network or data services platform and computer 1202 can be used in connection with implementing one or more of the systems, devices, or components shown and described in connection with FIG. 4 and other figures disclosed herein.

As illustrated at reference numeral 406, device 400 can receive dependency graph 408. Dependency graph 408 can be received, for example, from dependency graph construction device 304 detailed in connection with FIG. 3. Dependency graph 408 can characterize microservices 108 of microservices platform 106 as nodes 410. Dependency graph 408 can characterize associated interactions 411 that occur during run time execution of microservices 108 as edges 412 of dependency graph 408. By way of illustration, dependency graph 408 can, in some embodiments, be a directed graph in which an edge of the edges 412 represents an application programming interface (API) call invoked by microservice 108.

At reference numeral 414, device 400 can receive anomaly pattern 416. As introduced previously, an anomaly can refer to deviations from best practices or architectural principles, which can lead to inefficiencies, complexities, or issues in design or operation of microservices platform 106. In some cases, the so-called best practice itself may lead to the inefficiency or other issue, which is referred to herein as anti-pattern 417. One example of an anomaly can be found at FIG. 5A and various examples of anti-pattern 417 can be found at FIG. 5B.

Figure 5A:
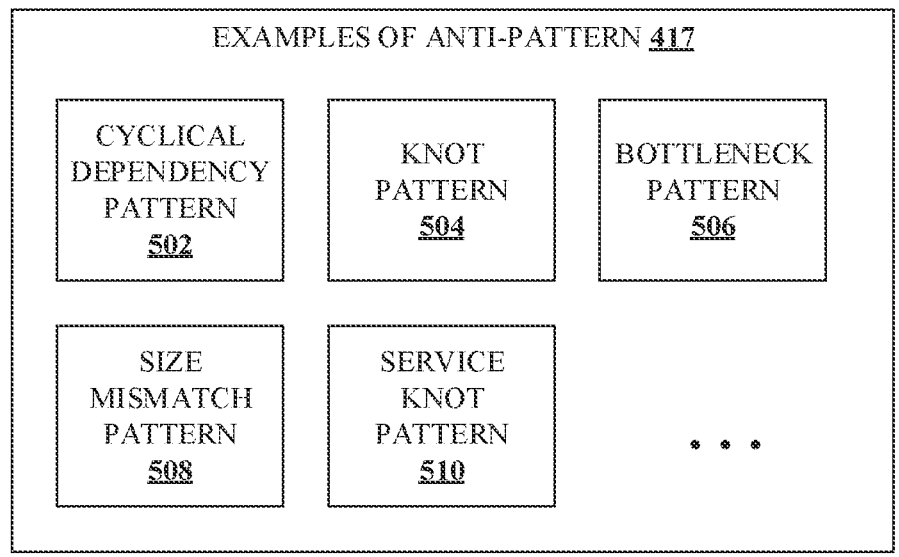
FIG. 5A depicts a schematic block diagram illustrating an anomaly indicative of a design or implementation issue in accordance with certain embodiments of this disclosure.
Figure 5B:
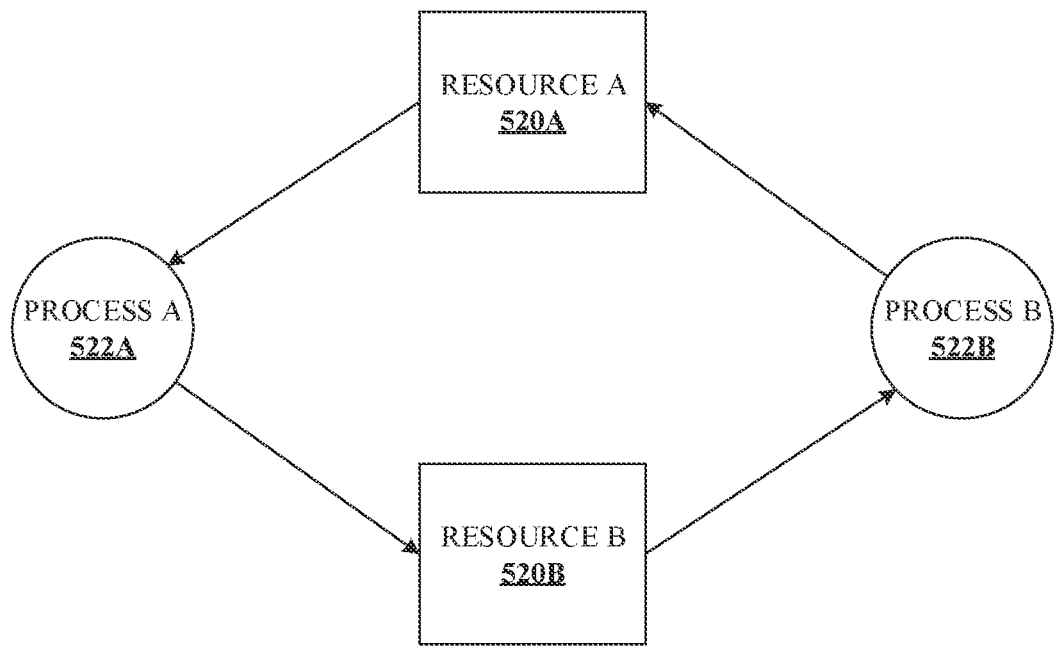
FIG. 5B depicts a schematic block diagram illustrating various examples of an anti-pattern in accordance with certain embodiments of this disclosure.

While still referring to FIG. 4, but turning now as well to FIGS. 5A-5B, FIG. 5A is a schematic block diagram 500A illustrating an anomaly indicative of a design or implementation issue in accordance with certain embodiments of this disclosure. In this case, diagram 500A shows a deadlock pattern that leads to inefficiencies or other issues. Here, process 520A is holding resource 522A and is waiting on resource 522B in order to complete the process and release all resources 522. However, process 520B is holding resource 522B and waiting on resource 522A in order to complete and release all resources. Hence, the deadlock, as neither process 520 can release the resource 522 the other needs to complete.

As discussed in connection with dependency graph construction device 304, dependency graph 408 can be constructed based on a dynamic dependency map generated during execution of microservices 108. Every service or process 520 can be modeled as a node with multiple pod instance nodes. Resources 522 like records with a unique primary key in tables can be modeled as instance nodes. Interactions between the nodes can be modeled as edges.

Hence, anomalies, like the deadlock issue above can be modeled as a graph or subgraph. This anomaly subgraph can be representative of anomaly pattern 416 that is received, which can be compared with dependency graph 408. During operation of microservices platform 106, snapshots of the dependency map and/or dependency graph 408 can be taken. Thus, if during the comparison, the anomaly pattern 416 representing a deadlock is found in dependency graph 408, then the associated deadlock issue can be identified.

With specific reference to FIG. 5B, a schematic block diagram 500B is depicted illustrating various examples of anti-pattern 417 in accordance with certain embodiments of this disclosure. As noted above, one example of anomaly can be anti-pattern 417. Hence, anomaly pattern 416 can be indicative of an anti-pattern 417. While anomalies often result from deviations from best practices, anti-pattern 417 can be the result of poorly defined best practices. For example, an anti-pattern 417 can be caused by a certain design or implementation practice that may seem reasonable at first, but ultimately leads to various challenges during the lifecycle of the deployed architecture. Hence, in essence, anti-pattern 417 can be indicative of design flaws that affect a system's non-functional requirements and can hinder the benefits of microservices platform 106, such as scalability, flexibility, and maintainability.

Extensive research has been dedicated to the detection of anti-patterns in software development. Previous approaches are directed to analyzing source code and employing a rules-based technique to identify expected symptoms of anti-patterns. In contrast, in accordance with the disclosed techniques, anti-pattern 417 can be identified by comparing a subgraph model of the anti-pattern 417 (e.g., anomaly pattern 416) to a dynamic dependency graph 408 that is constructed during execution of microservices 108, which can thereby dynamically model the entire ecosystem of microservices platform 106.

Some common examples of anti-patterns 417 in software development include cyclical dependency pattern 502. Cyclical dependency pattern 502 is indicative of a cyclical or circular dependency. Such can occur when two or more modules or components depend on each other directly or indirectly, forming a loop in their dependencies. Such can create a situation where it becomes difficult to compile, build, test, or maintain the software system effectively. The deadlock pattern of diagram 500A can be on example of cyclical dependency pattern 502.

Another example of anti-pattern 417 can be knot pattern 504. In the context of anti-patterns for software development, a "knot" can refer to a situation where multiple components or modules in a software system are tightly interconnected in a complex and convoluted manner. This tight coupling can create dependencies between the components that are difficult to untangle or resolve, leading to issues such as reduced maintainability, increased complexity, and difficulty in making changes or enhancements to the system.

Another example of anti-pattern 417 can be bottleneck pattern 506. In the context of anti-patterns for software development, a "bottleneck" can refer to a point in a system where the flow of data, resources, or operations is significantly constrained, leading to reduced performance, throughput, or efficiency. Bottlenecks can occur at various levels of the software stack, including hardware, software, network, and database components.

Another example of anti-pattern 417 can be size mismatch pattern 508. In the context of anti-patterns for software development, a "size mismatch" can refer to a situation where there is inconsistency or discrepancy in the size or capacity of data structures, buffers, or memory allocations used within the software system. Size mismatches can lead to various issues, including memory corruption, buffer overflows, data loss, and security vulnerabilities. Size mismatches can manifest in several ways, including, e.g., buffer overflows, memory allocation errors, data structure inconsistencies, data serialization and de-serialization, input validation errors and so on.

Another example of anti-pattern 417 can be service chain pattern 510. In the context of anti-patterns for software development, a "service chain" refers to a design pattern where multiple services or components in a software system are connected in a linear sequence, with each service depending on the output of the previous one in the chain. Service chains can lead to a tightly coupled architecture where changes in one service can have cascading effects on downstream services, making the system fragile, difficult to maintain, and challenging to scale.

Still referring to FIG. 4, regardless of the type or nature of a given anomaly, any suitable anomaly, including anti-patterns 417, can be modeled according to a graph representation. Hence, anomaly pattern 416, received at reference numeral 414, can be any suitable graph representation of a given anomaly. Therefore, upon comparing dependency graph 408 to anomaly pattern 416, matches can indicate that the anomaly exists.

However, it is appreciated that dependency graph 408 can model all microservices 108 (e.g., as nodes 410) and associated interactions 411 (e.g., as edges 412) for the entirety of microservices platform 106. Hence, dependency graph 408 can be quite large in size. Comparing anomaly pattern 416 at each node 410 or associated neighborhood in a naïve manner is not particularly efficient or scalable. Instead, in some embodiments, the disclosed subject matter can leverage neural subgraph matching to more efficiently identify anomalies or anti-patterns 417. For instance, comparisons can be made in an embedding space rather than on dependency graph 408, which can be significantly faster and more efficient.

For example, at reference numeral 418 device 300 can generate embedding space 420 for dependency graph 408. Embedding space 420 can comprise any suitable number of dimensions 422. A given dimension 422 is conceptually illustrated as different axes x, y, and z, but it is understood that a given dimension 422 can represent a defined property 424 of microservices 108 and/or microservices platform 106, and each property 424 can be associated with a different dimension 422.

A given subgraph 428 of dependency graph 408 can be represented in embedding space 420 as one or more multi-dimensional vectors 426. Subgraph 428 can be indicative of a small portion or neighborhood of dependency graph 408. Multi-dimensional vectors 426 can comprise vector values 430, e.g., a different value for each of the multiple dimensions 422.

Concepts directed to an embedding space are used in the domains of machine learning and in particular for natural language processing (NLP). Hence, in NLP generally, an embedding space refers to a multi-dimensional vector space where words, phrases, or other entities are represented as numerical vectors. Each dimension in the embedding space corresponds to a specific feature or attribute, and the position of a vector in the space can indicate semantic relationships and similarities between entities.

Word embeddings, in particular, are widely used in NLP tasks to represent words as dense, fixed-size vectors in an embedding space. These embeddings capture semantic relationships between words based on their context in a corpus of text. For example, words that are semantically similar or related (e.g., "king" and "queen") tend to have similar embeddings and are located close to each other in the embedding space.

The embedding space can be learned using techniques such as word2vec, GloVe (Global Vectors for Word Representation), or deep learning-based methods like Word Embeddings from Language Models (e.g., BERT). These methods use large datasets to train neural networks to predict word embeddings based on their context or co-occurrence statistics.

The inventors have observed that embedding spaces (e.g., embedding space 420) can also be used to represent entities other than words, such as documents, images, user preferences, or in this case properties 424 of a microservice platform 106 and/or associated microservices 108. Thus, the embedding space 420 can capture relationships and similarities between microservices 108 based on their features or attributes indicated by properties 424 and/or dimensions 422.

In order to generate embedding space 420, device 400 can represent nodes 410 and edges 412 of dependency graph 408 as vectors in a high-dimensional space, such that the geometric relationships between the vectors (e.g., multi-dimensional vectors 426) capture the structural and semantic properties of the dependency graph 408.

Such can comprise techniques such as node embedding, edge embedding, graph-level embedding, training and optimization, evaluation, and so forth. Node embedding can refer to a procedure in which each node of a graph is represented as a dense vector in the embedding space. Such can be done using techniques such as Node2Vec, DeepWalk, or graph convolutional networks (GCNs). These techniques learn embeddings by considering the local neighborhood structure of nodes and capturing the structural properties of the graph.

Edge embedding can comprise representing each edge in the graph as a vector that encodes the relationship between the source and target nodes. One common approach is to concatenate or combine the embeddings of the source and target nodes to create the edge embedding. Alternatively, edge embeddings can be learned directly using techniques such as graph neural networks (GNNs) or attention mechanisms.

Graph-level embeddings can be utilized in cases in which it is useful to learn a single embedding vector that represents the entire graph. This can be done by aggregating the embeddings of all nodes or by applying pooling operations to the node embeddings. Graph-level embeddings capture global properties of the graph and can be useful for tasks such as graph classification or clustering.

Training and optimization can be performed once the nodes, edges, and optionally the graph-level embeddings are defined. The embedding vectors are typically trained using techniques such as stochastic gradient descent (SGD) or backpropagation. The objective function used for training depends on the specific task and application, but commonly involves minimizing a loss function that measures the discrepancy between the predicted and true embeddings.

After training an embedding model, it can be useful to evaluate the quality of the learned embeddings using appropriate metrics and validation procedures. This may involve tasks such as link prediction, node classification, or graph reconstruction, where the embeddings are used to make predictions or perform inference on unseen data.

By converting a graph (e.g., dependency graph 408) to an embedding space (e.g., embedding space 420), one can have access to geometric representations that can be leveraged to analyze and reason about the structure, properties, and relationships within the graph.

In a similar manner, at reference numeral 432, device 400 can convert anomaly pattern 416 to a multi-dimensional vector 426. As such, the particular multi-dimensional vector 426 that represents anomaly pattern 416 can be input to embedding space 420 just as multi-dimensional vector 426 were input for particular subgraphs 428 of dependency graph 408.

At reference numeral 434, device 400 can determine if anomaly pattern 416 exists in subgraph 428 and/or dependency graph 408. In some embodiments, as indicated at reference numeral 436, such can be determined in response to comparing vector values 430 for a first multi-dimensional vector 426 (e.g., one that represents subgraph 428) to vector values 430 for a second multi-dimensional vector 426 (e.g., one that represents anomaly pattern 416). Additional detail in that regard is further detailed with reference to FIGS. 6A, 6B, and 7.

Figure 6A:
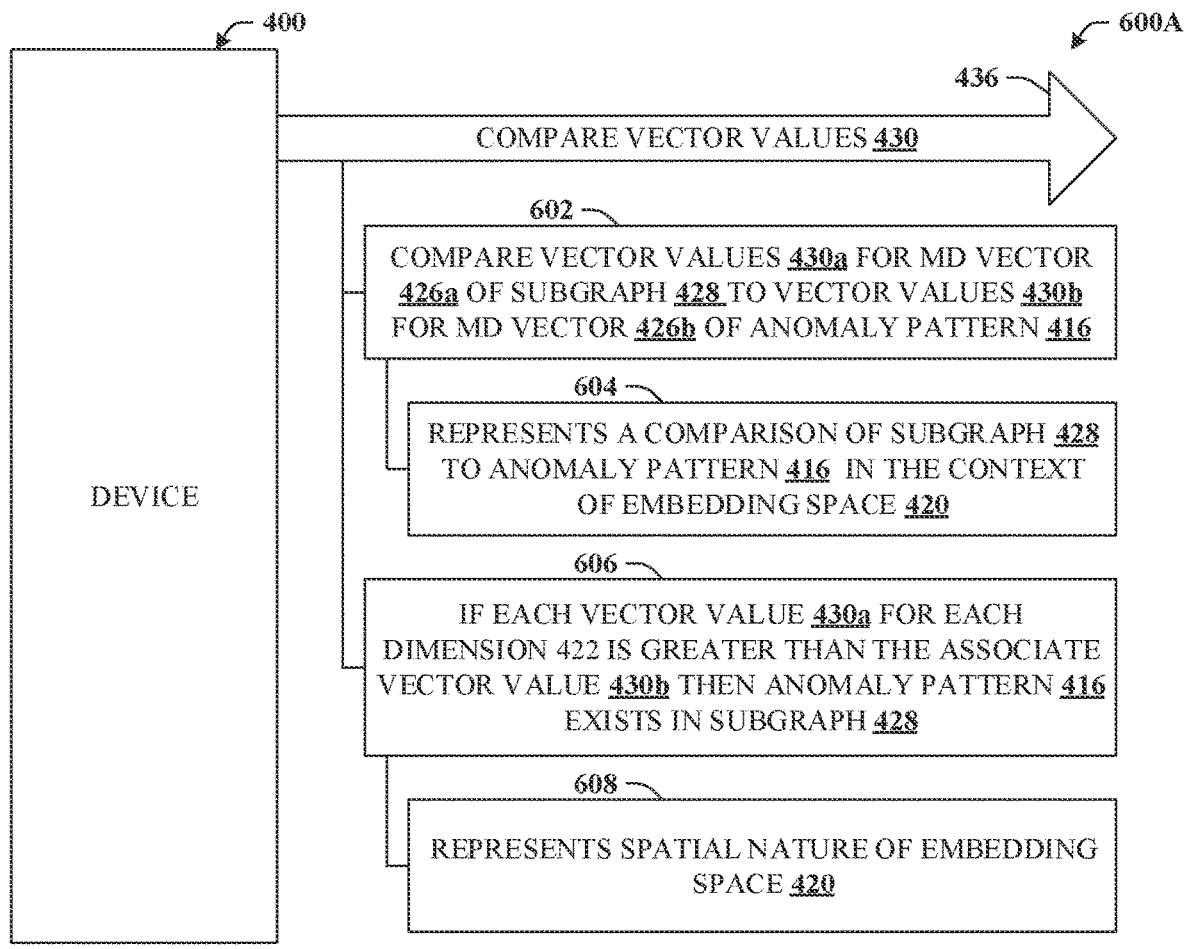
FIG. 6A depicts a schematic block diagram illustrating additional elements or embodiments relating to the device that compares the vector values in order to determine the existence of an anomaly in accordance with certain embodiments of this disclosure.

With reference now to FIG. 6A, a schematic block diagram 600A is depicted illustrating additional elements or embodiments relating to device 400 that compares vector values 430 in order to identify the existence of an anomaly in accordance with certain embodiments of this disclosure. For example, in the context of comparing vector values 430 introduced at reference numeral 436 of FIG. 4, additional detail is provided with reference to reference numeral 602.

At 602, device 400 can compare vector values 430a (e.g., one for each dimension 422) for a multi-dimensional vector 426a of subgraph 428 to vector values 430b for a multi-dimensional vector 426b of anomaly pattern 416. As indicated at reference numeral 604, such can represent a comparison of subgraph 428 to anomaly pattern 416 in the context of embedding space 420.

At reference numeral 606, if device 400 determines that each vector value 430a for each dimension 422 is greater than the associated vector value 430b, the anomaly pattern 416 is determined to exist in subgraph 428. As indicated at reference numeral 608, the ability to merely compare vector values 430 to determine whether one value is greater than another (e.g., for each existing dimension 422) in order to identify the presence of an anomaly represents leveraging the spatial nature of embedding space 420, which is further illustrated with reference to FIG. 7.

Figure 7:
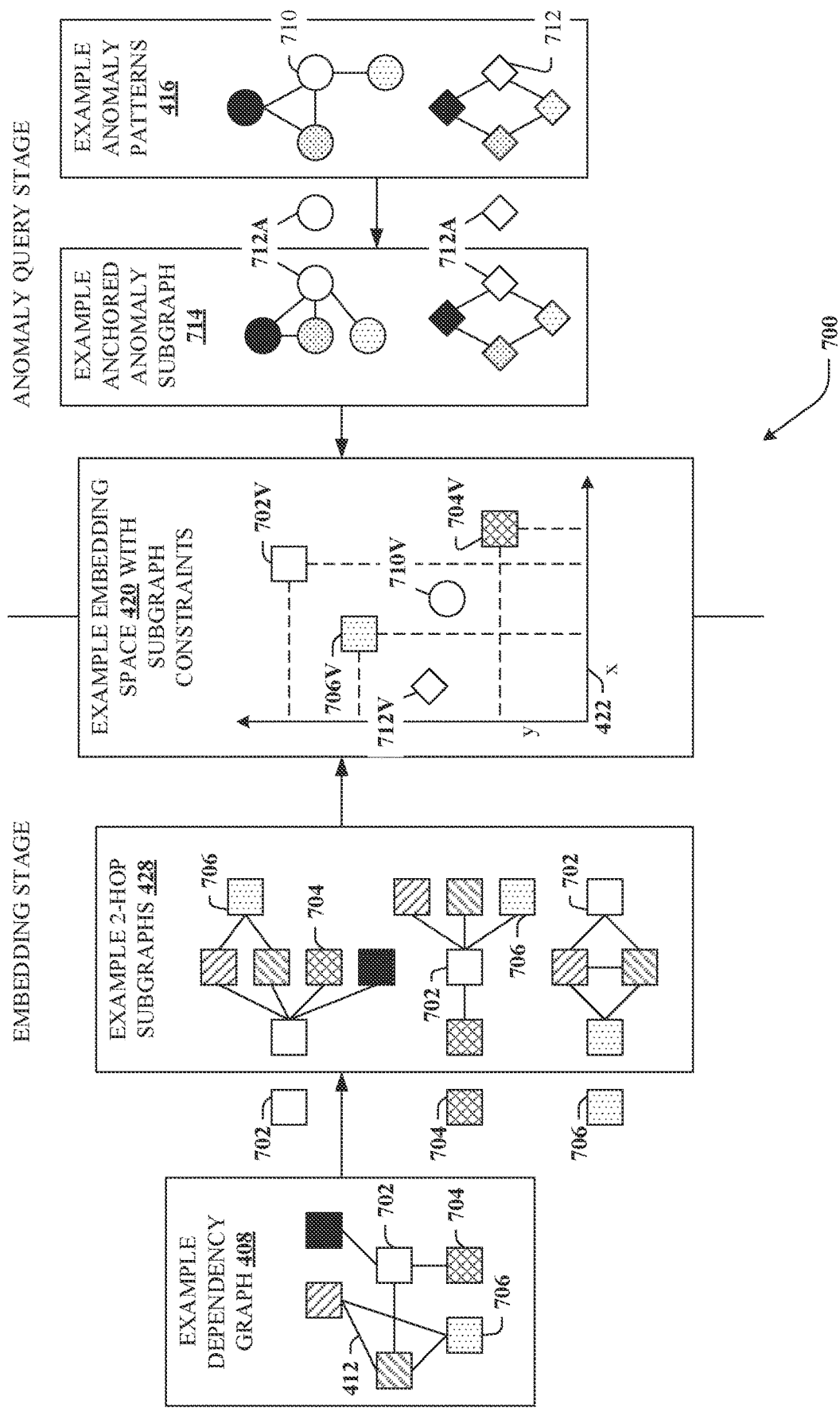
FIG. 7 depicts a schematic graphical diagram illustrating certain functional elements of the devices disclosed above in more detail in accordance with certain embodiments of this disclosure.

Turning now to FIG. 7, schematic diagram 700 graphically illustrates certain functional elements of devices 300, 400 in more detail in accordance with certain embodiments of this disclosure. From the context of embedding space 420, diagram 700 is divided into two stages, namely the embedding stage on the left and the anomaly query stage on the right.

When provided with dependency graph 408, comprising nodes 410 and edges 412, dependency graph 408 can be decomposed into neighborhoods around each node 410. For example, each neighborhood can represent a different k-hop subgraph 428, where k can be any suitable whole number, but in this example k is two. As used herein, a "hop" can be indicative of traversing from a first node 410 to a second node 410 via an available edge 412.

As illustrated, three of the nodes 410 of dependency graph 408 are called out to demonstrate, namely node 702, node 704, and node 706. The 2-hop subgraph 722 with node 702 as the starting node is shown initially, followed by the 2-hop subgraph 724 with node 704 as the starting node, followed by the 2-hop subgraph 726 with node 706 as the starting node. Although such is only shown for the three labeled nodes 702-706, such can be performed for every node of dependency graph 408.

Thereafter a graph neural network (GNN) can be leveraged to embed each subgraph 722-726 into embedding space 420, as multi-dimensional vectors 426, in this case multi-dimensional vectors 722V, 724V, and 726V, which respectively represent the different 2-hop subgraphs 722, 724, and 726 that result from respectively selecting as the center or starting node from among nodes 702, 704, and 706. In some embodiments, the GNN can be trained to reflect the subgraph relationships.

For instance, if a given 2-hop subgraph 428 is a subgraph (e.g., all nodes 410 and edges 412 of one are included in the other) of another 2-hop subgraph 428, then the second 2-hop subgraph 428 should be embedded to the lower-left of the first 2-hop subgraph 428. In more detail, since the 2-hop subgraph 726 is a subgraph of 2-hop subgraph 722, the embedding of multi-dimensional vector 726V is spatially below (e.g., has a lower y-axis value) and to the left (e.g., has a lower x-axis value) of multi-dimensional vector 722V. In other words, associated vector values 430 for all dimensions 422 can have lower values for the subgraph and/or greater values for the supergraph.

During the anomaly query stage, a given anomaly pattern 416 can be decomposed by selecting an anchor node and embedding it. In the first example, node 710 is selected as the anchor point 710A, whereas in the second example, node 712 is selected as anchor point 712A. The first query is embedded as multi-dimensional vector 710V and the second query is embedded as multi-dimensional vector 712V.

From the embedding itself, one can readily determine that the first query, represented by multi-dimensional vector 710V, is a subgraph of the neighborhood around node 702 because 710V is below and to the left of 722V. The second query, represented by multi-dimensional vector 712V, is a subgraph of the neighborhoods around nodes 702 and 706, as multi-dimensional vector 712V is below and to the left of both multi-dimensional vectors 722V and 726V. Multi-dimensional vector 712V, is not below and to the left of multi-dimensional vector 724V, so the anomaly is not present around the neighborhood of node 704.

Advantageously, the above approach can identify whether an anomaly or anti-pattern 416 exists in a graph or subgraph (e.g., a given neighborhood) by simply comparing the spatial locations of associated multi-dimensional vectors 426 in embedding space 420. Such a comparison can avoid expensive operations such combinatorial matching of subgraphs.

Rather, the disclosed techniques can exploit the geometry of graph embedding space to capture the properties of subgraph isomorphism. As used herein, isomorphism is used as known in graph theory. For example, in the context of graph theory, two objects are said to be isomorphic if they have the same structure or properties, despite potentially having different appearances or labels.

Hence, if anomaly pattern 416 is identified to be isomorphic with dependency graph 408 or an associated neighborhood or subgraph 428, then the anomaly exists in the dependency graph 408. Accordingly, the query comprising anomaly pattern 416 can processed as a binary prediction by a GNN, returning either true or false.

Figure 8:
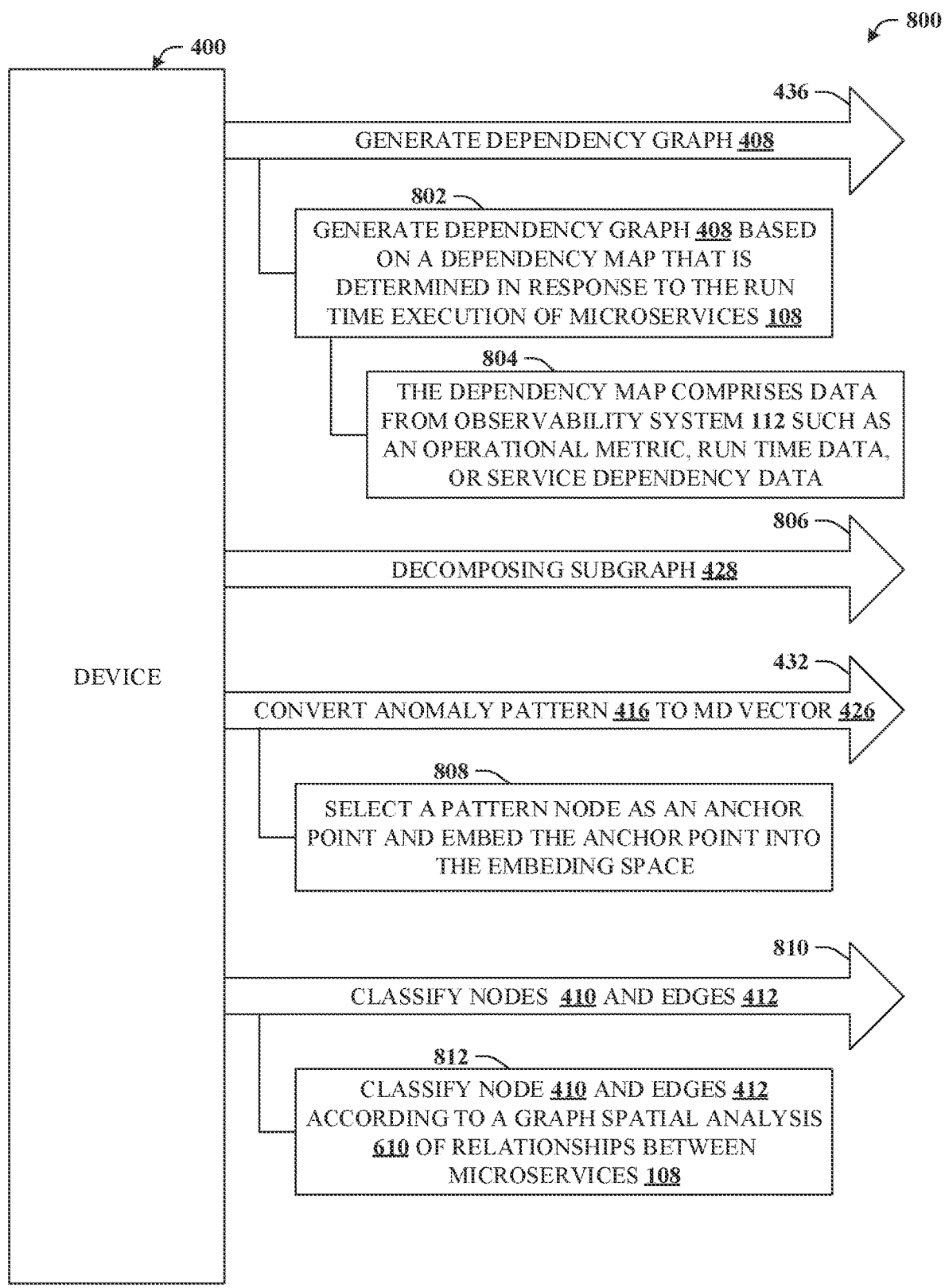
FIG. 8 depicts a schematic block diagram illustrating additional aspects or elements of the system that can analyze a dependency graph in order to identify an anomaly in accordance with certain embodiments of this disclosure.

With reference now to FIG. 8, a schematic block diagram 800 is depicted illustrating additional aspects or elements of the system that can analyze a dependency graph in order to identify an anomaly in accordance with certain embodiments of this disclosure. As introduced at reference numeral 406 of FIG. 4, device 400 can receive dependency graph 408.

In some embodiments, device 400 can generate dependency graph 408. For example, in some embodiments, device 400 can further comprise dependency graph construction device 304, discussed in connection with FIG. 3. As discussed, dependency graph construction device 304 (or device 400) can generate dependency graph 408 based on a dynamic dependency map that is determined in response to the run time execution of microservices 108, as indicated by reference numeral 804. At reference numeral 806, it is understood that the dependency map can comprise data from observability system 112. The data can be related to an operational metric, run time data, service dependency data, and so on.

At reference numeral 808, device 400 can decompose dependency graph 408 into various portions or neighborhoods, such as subgraphs 722, 724, and 726. Such can involve selecting a first node (e.g., node 702, 704, 706) of nodes 410 and only others of the nodes 410 and edges 412 that are within a given number (e.g., two) hops of the first node.

Recall that device 400 can convert anomaly pattern 416 to multi-dimensional vector 426, as detailed in connection with reference numeral 432 of FIG. 4. In more detail, as indicated at reference numeral 810, device 400 can select a pattern node (e.g., node 710, 712) as an anchor point (e.g., 710A, 712A) and embed the anchor point into embedding space 420.

Figure 6B:
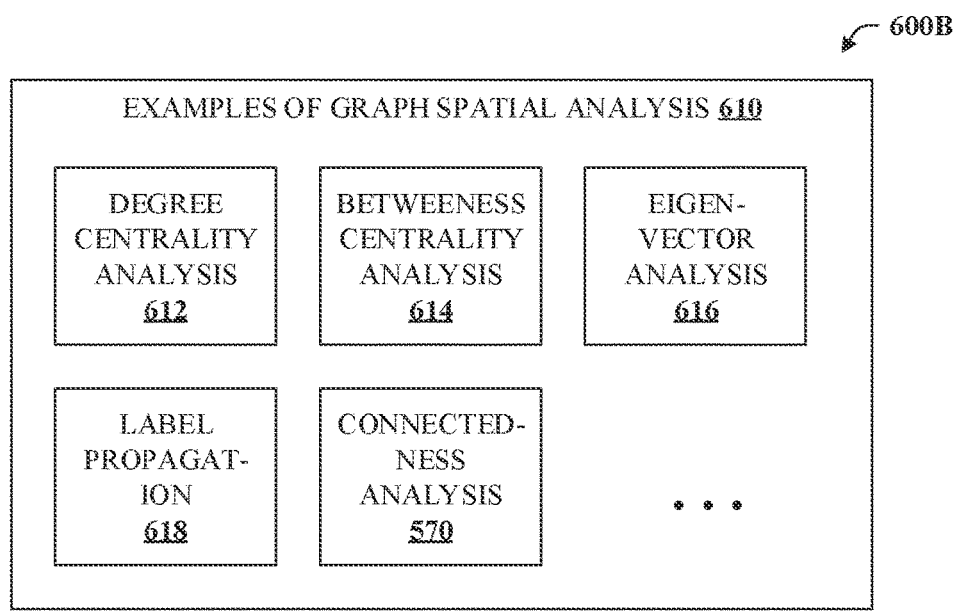
FIG. 6B illustrates a schematic block diagram illustrating various examples of the graph spatial analysis in accordance with certain embodiments of this disclosure.

Furthermore, in some embodiments, as illustrated at reference numeral 812, device 400 can classify nodes 410 and edges 412. For example, in some embodiments, device 400 can further comprise node and edge classification device 306, discussed in connection with FIG. 3. In more detail, as indicated at reference numeral 814, device 400 can classify nodes 410 and edges 412 of dependency graph 408 according to a graph spatial analysis of relationships between microservices 108. FIG. 6B presents some examples of graph spatial analysis.

Turning now to FIG. 6B, a schematic block diagram 600B is depicted illustrating various examples of graph spatial analysis 610 in accordance with certain embodiments of this disclosure. For instance, in some embodiments, graph spatial analysis 610 can be degree centrality analysis 612. Degree centrality analysis 612 can relate to measuring the relationships connected to a node in order to determine the most connected nodes in a given graph. In the context of a directed graph, the relationships can be incoming, outgoing, or both.

Another example of graph spatial analysis 610 can be betweenness centrality analysis 614. Betweenness centrality analysis 614 can be directed to determining influential nodes of a graph, that is, nodes that act as thoroughfares for the shortest paths in the scene. Nodes with a high degree of betweenness centrality can be nodes that connect different sub-parts of a graph.

Still another example or graph spatial analysis 610 can be Eigenvector centrality analysis 616. Eigenvector centrality analysis 616 can be directed to determining or measuring the transitive influences of nodes. Such can be that for a node to have a high Eigenvector centrality score, that node is connected to other nodes which in turn are well-connected.

Another example or graph spatial analysis 610 can be label propagation analysis 618. Label propagation analysis 618 can be used for community detection in networks. A goal of label propagation analysis 618 can be to partition the nodes of a graph into communities or clusters based on the similarity of their connectivity patterns. Such might also include Louvain analysis, which can focus on detection of highly connected nodes within a community.

Another example or graph spatial analysis 610 can be connectedness analysis 620. Connectedness analysis 620 can include weakly connected components (WCC) analysis or algorithms or another type of connectedness algorithm. WCC analysis can be directed to identifying subgraphs that are unreachable from other parts of a graph. Hence, WCC analysis can indicate whether or not a network is fully connected.

Example Methods

Figure 9:
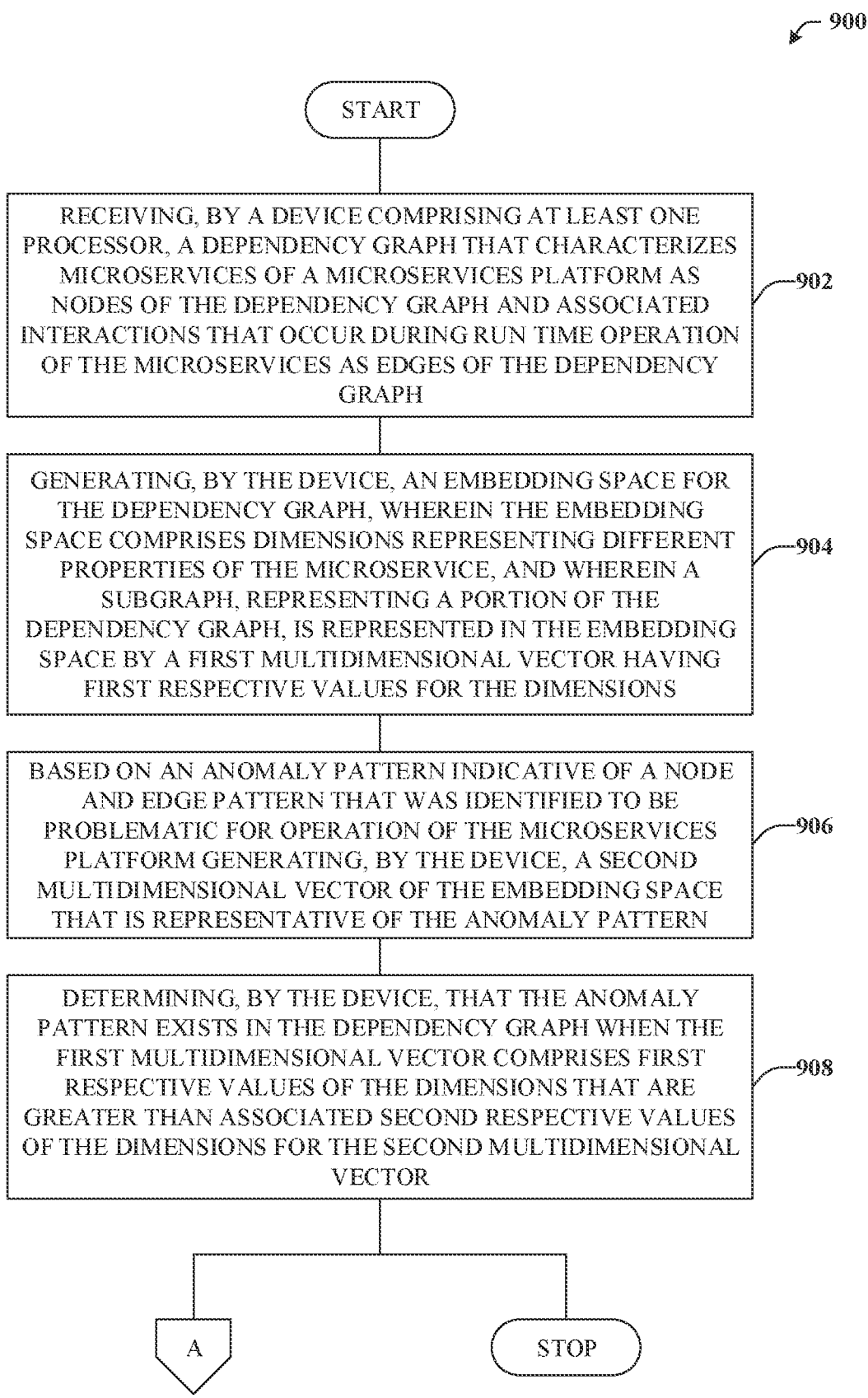
FIG. 9 illustrates an example method that can automatically and/or dynamically generate dashboards and alarms for microservices of a microservices platform in accordance with certain embodiments of this disclosure.
Figure 10:
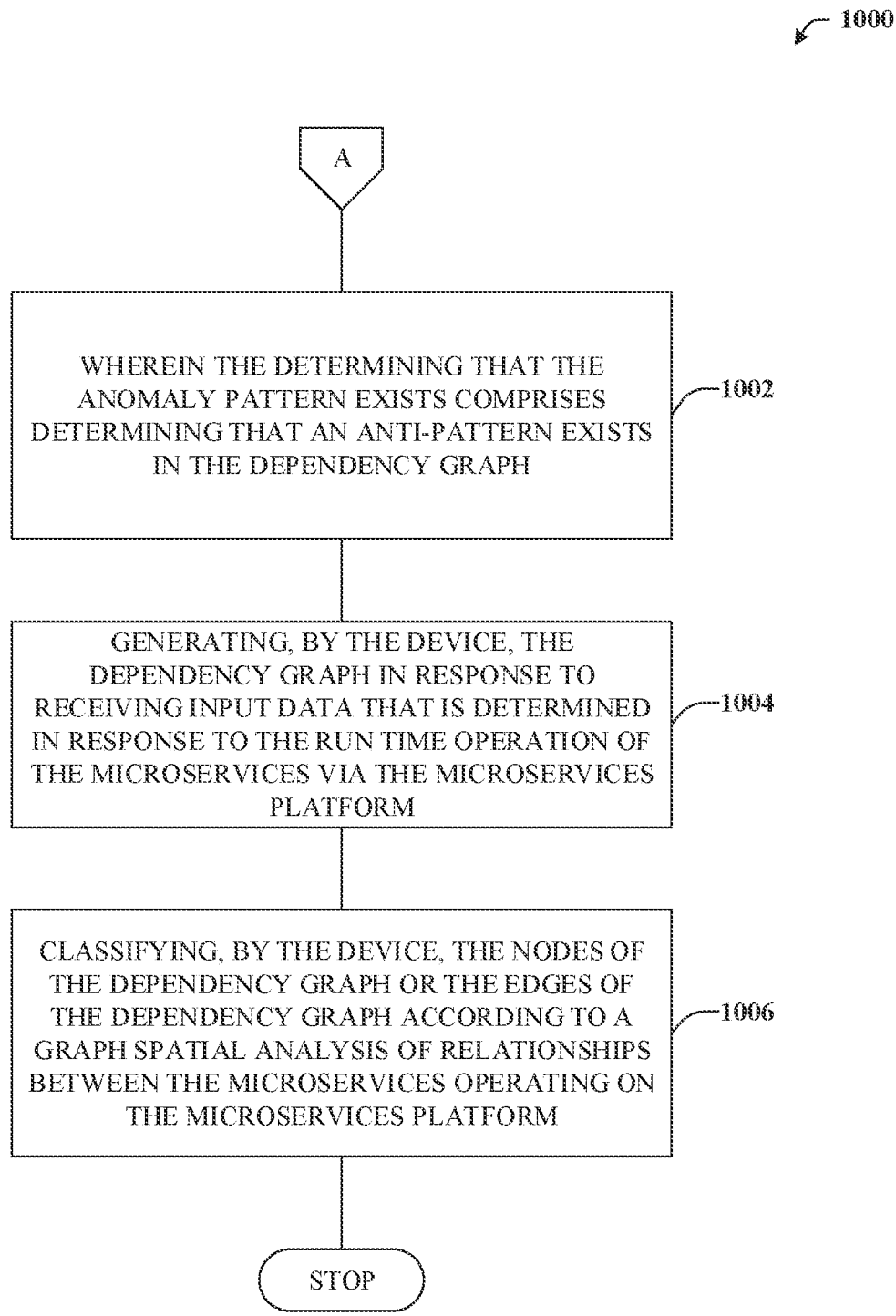
FIG. 10 illustrates an example method that can provide for additional functionality or elements relating to generating dashboards and alarms for microservices of a microservices platform in accordance with certain embodiments of this disclosure.

FIGS. 9 and 10 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 9, exemplary method 900 is depicted. Method 900 can analyze a dependency graph in order to identify an anomaly in accordance with certain embodiments of this disclosure. While method 900 describes a complete method, in some embodiments, method 900 can include one or more elements of method 1000, reached via insert A, as discussed at FIG. 10.

At reference numeral 902, a device comprising at least one processor can receive a dependency graph. The dependency graph can characterize microservices of a microservices platform as nodes of the dependency graph and associated interactions of the microservices that occur during run time operation of the microservices as edges of the dependency graph.

At reference numeral 904, the device can generate an embedding space for the dependency graph. The embedding space can comprise any suitable number of dimensions. Each dimension can represent a different properties of the microservices platform and/or microservices. Elements of the dependency graph (e.g., subgraphs, nodes, . . . ) can be embedded in the embedding space and characterized therein by a multidimensional vector. Hence, a given subgraph (e.g., a neighborhood around a given node or other portion of the dependency graph) can be represented in the embedding space by a first multidimensional vector having first respective values for the dimensions.

At reference numeral 906, the device can, based on an anomaly pattern indicative of a node and edge pattern that was identified to be problematic for operation of the microservices platform, generate a second multidimensional vector of the embedding space that is representative of the anomaly pattern.

At reference numeral 908, the device can determine that the anomaly pattern exists in the dependency graph when the first multidimensional vector comprises first respective values of the dimensions that are greater than associated second respective values of the dimensions for the second multidimensional vector. Method 900 can terminate in some embodiments, or proceed to insert A in other embodiments, which is further detailed in connection with FIG. 10.

Turning now to FIG. 10, exemplary method 1000 is depicted. Method 1000 can provide for additional functionality or elements relating to analyzing a dependency graph in order to identify an anomaly in accordance with certain embodiments of this disclosure.

For example, at reference numeral 1002, the device introduced in FIG. 9 can further determine that the anomaly pattern is an anti-pattern that exists in the dependency graph. Anti-patterns can be the result of poorly defined practices. For example, an anti-pattern can be caused by a certain design or implementation practice that may seem reasonable at first, but ultimately leads to various challenges during the lifecycle of the deployed architecture.

A reference numeral 1004, the device can generate the dependency graph in response to receiving input data that is determined in response to the run time operation of the microservices via the microservices platform. At reference numeral 1006, the device can classify the nodes of the dependency graph or the edges of the dependency graph. In some embodiments, the nodes or edges can be classified according to a graph spatial analysis of relationships between the microservices operating on the microservices platform.

Example Operating Environments

Figure 11:
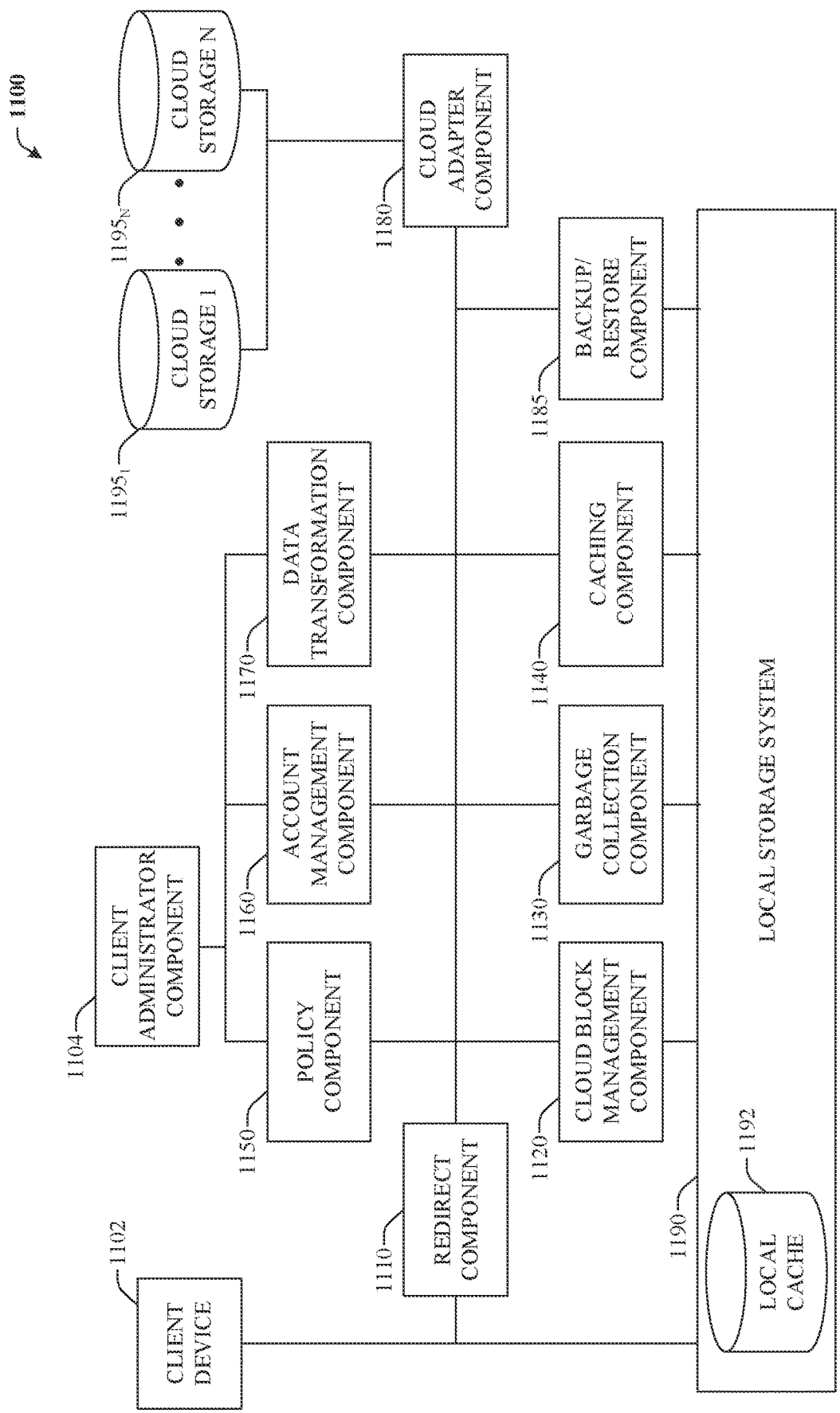
FIG. 11 illustrates a block diagram of an example distributed file storage system that employs tiered cloud storage in accordance with certain embodiments of this disclosure.
Figure 12:
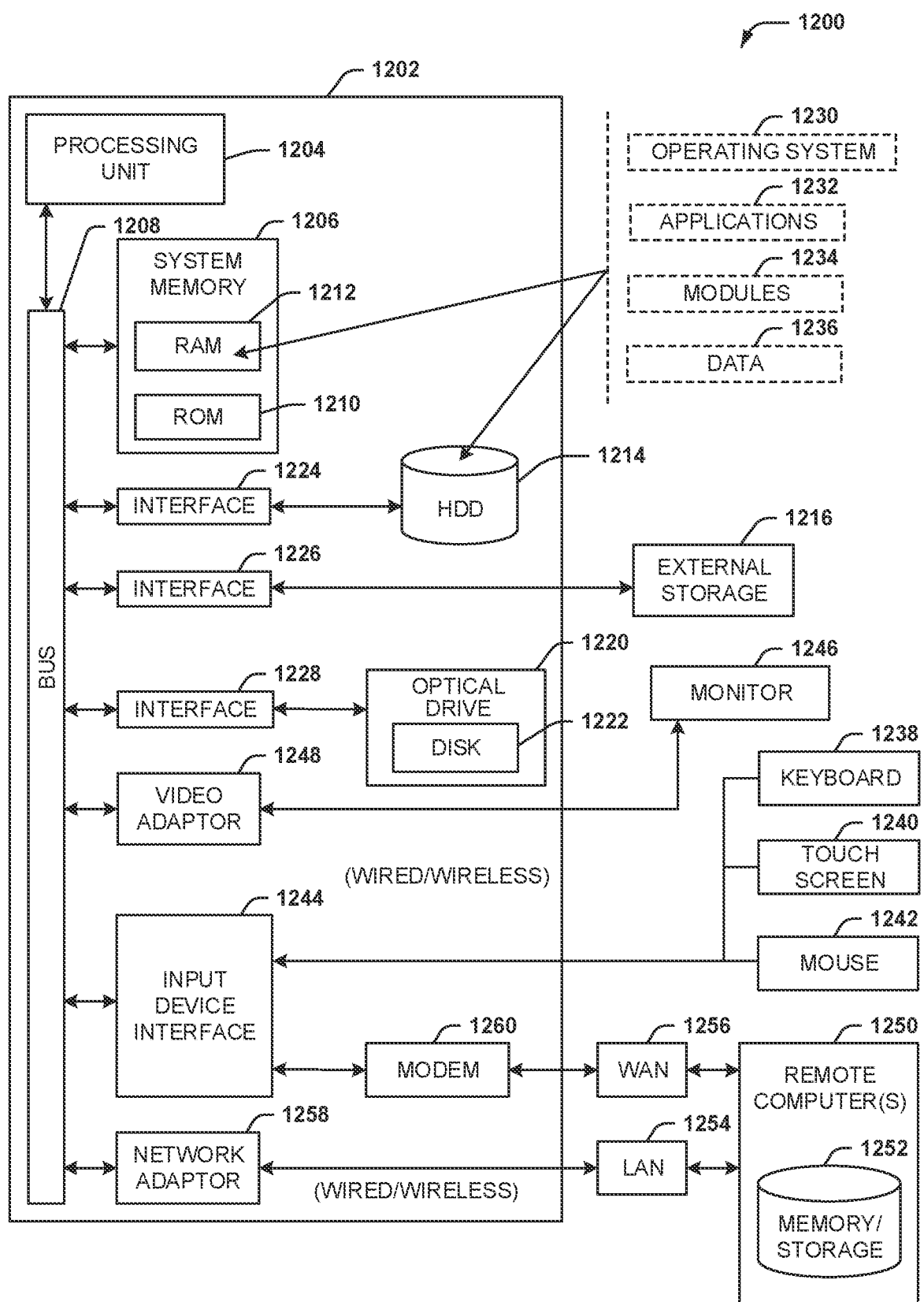
FIG. 12 illustrates an example block diagram of a computer operable to execute certain embodiments of this disclosure.

To provide further context for various example embodiments of the subject specification, FIGS. 11 and 12 illustrate, respectively, a block diagram of an example distributed file storage system 1100 that employs tiered cloud storage and block diagram of a computer 1202 operable to execute the disclosed storage architecture in accordance with example embodiments described herein.

Referring now to FIG. 11, there is illustrated an example local storage system including cloud tiering components and a cloud storage location in accordance with implementations of this disclosure. Client device 1102 can access local storage system 1190. Local storage system 1190 can be a node and cluster storage system such as an EMC Isilon Cluster that operates under OneFS operating system. Local storage system 1190 can also store the local cache 1192 for access by other components. It can be appreciated that the systems and methods described herein can run in tandem with other local storage systems as well.

As more fully described below with respect to redirect component 1110, redirect component 1110 can intercept operations directed to stub files. Cloud block management component 1120, garbage collection component 1130, and caching component 1140 may also be in communication with local storage system 1190 directly as depicted in FIG. 11 or through redirect component 1110. A client administrator component 1104 may use an interface to access the policy component 1150 and the account management component 1160 for operations as more fully described below with respect to these components. Data transformation component 1170 can operate to provide encryption and compression to files tiered to cloud storage. Cloud adapter component 1180 can be in communication with cloud storage 1 1195$_1$ and cloud storage N 1195N, where N is a positive integer. It can be appreciated that multiple cloud storage locations can be used for storage including multiple accounts within a single cloud storage location as more fully described in implementations of this disclosure. Further, a backup/restore component 1185 can be utilized to back up the files stored within the local storage system 1190.

Cloud block management component 1120 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1120 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1160 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1120 based on a list of mappings that the cloud block management component 1120 manages. For example, each stub can be associated with an account, and the cloud block management component 1120 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1180 manages the sending and receiving of data to and from the cloud service providers. The cloud adapter component 1180 can utilize a set of APIs. For example, each cloud service provider may have provider specific API to interact with the provider.

A policy component 1150 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1130. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1130 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1140 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1120, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1140 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1140 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that the file has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time the stub file is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1170 can encrypt and/or compress data that is tiered to cloud storage. In relation to encryption, it can be appreciated that when data is stored in off-premises cloud storage and/or public cloud storage, users can request or require data encryption to ensure data is not disclosed to an illegitimate third party. In one implementation, data can be encrypted locally before storing/writing the data to cloud storage.

In one implementation, the backup/restore component 1185 can transfer a copy of the files within the local storage system 1190 to another cluster (e.g., target cluster). Further, the backup/restore component 1185 can manage synchronization between the local storage system 1190 and the other cluster, such that, the other cluster is timely updated with new and/or modified content within the local storage system 1190.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various example embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
   at least one processor; and
   at least one memory that stores executable instructions that, when executed by the at least one processor, facilitate performance of operations, comprising:
      receiving a dependency graph that characterizes microservices of a microservices platform as nodes of the dependency graph and associated interactions that occur during run time execution of the microservices as edges of the dependency graph;
      receiving an anomaly pattern indicative of a node and edge pattern that was identified, according to a defined criterion, to be problematic for operation of the microservices platform;
      generating an embedding space for the dependency graph, wherein the embedding space comprises dimensions representing different properties of the microservices, and wherein a subgraph, representing a portion of the dependency graph, is represented in the embedding space by a first multidimensional vector having first respective values for the dimensions;
      transforming the anomaly pattern to a second multidimensional vector of the embedding space having second respective values for the dimensions; and
      determining that the anomaly pattern exists in the dependency graph in response to a determination that each of the first respective values is each greater than an associated one of the second respective values.

2. The device of claim 1, wherein the dependency graph is a directed graph in which an edge of the edges represents an application programming interface (API) call invoked by a microservice of the microservices.

3. The device of claim 1, wherein the anomaly pattern is an anti-pattern that occurs during the run time execution of the microservices.

4. The device of claim 3, wherein the anti-pattern is at least one of a cyclical dependency pattern, a knot pattern, a bottleneck pattern, a size mismatch pattern, or a service knot pattern.

5. The device of claim 1, wherein the portion of the dependency graph represented by the subgraph comprises a decomposition of the dependency graph as a first node of the nodes and only others of the nodes and the edges that are within two hops of the first node, wherein a hop of the hops represents a traversal of a connected edge.

6. The device of claim 1, wherein the transforming of the anomaly pattern to the second multidimensional vector comprises selecting a pattern node of the anomaly pattern as an anchor point and embedding the anchor point into the embedding space.

7. The device of claim 1, wherein the operations further comprise generating the dependency graph in response to receiving a dependency map that is determined in response to the run time execution of the microservices via the microservices platform.

8. The device of claim 7, wherein the dependency map comprises at least one of operational metric data associated with at least one of the microservices, trace data associated with at least one of the microservices, run time data associated with at least one of the microservices, or service dependency data associated with at least one of the microservices.

9. The device of claim 1, wherein the operations further comprise classifying the nodes of the dependency graph or the edges of the dependency graph according to a graph spatial analysis of relationships between the microservices.

10. The device of claim 9, wherein the graph spatial analysis comprises at least one of a degree centrality analysis, a betweenness centrality analysis, an eigenvector analysis, a label propagation analysis, or a connectedness analysis.

11. A method, comprising:
receiving, by a device comprising at least one processor, a dependency graph that characterizes microservices of a microservices platform as nodes of the dependency graph and associated interactions that occur during run time operation of the microservices as edges of the dependency graph;
generating, by the device, an embedding space for the dependency graph, wherein the embedding space comprises dimensions representing different properties of the microservice, and wherein a subgraph, representing a portion of the dependency graph, is represented in the embedding space by a first multidimensional vector having first respective values for the dimensions;
based on an anomaly pattern indicative of a node and edge pattern that was identified to be problematic for operation of the microservices platform generating, by the device, a second multidimensional vector of the embedding space that is representative of the anomaly pattern; and
determining, by the device, that the anomaly pattern exists in the dependency graph when the first multidimensional vector comprises first respective values of the dimensions that are greater than associated second respective values of the dimensions for the second multidimensional vector.

12. The method of claim 11, wherein the determining that the anomaly pattern exists comprises determining that an anti-pattern exists in the dependency graph.

13. The method of claim 11, further comprising generating, by the device, the dependency graph in response to receiving input data that is determined in response to the run time operation of the microservices via the microservices platform.

14. The method of claim 11, further comprising classifying, by the device, the nodes of the dependency graph or the edges of the dependency graph according to a graph spatial analysis of relationships between the microservices operating on the microservices platform.

15. A non-transitory computer-readable medium comprising instructions that, in response to execution, cause a system comprising at least one processor to perform operations, comprising:
receiving a dependency graph that characterizes software components of a cloud services platform as nodes of the dependency graph and associated interactions, which occur during execution of the software components, as edges of the dependency graph;
generating an embedding space of the dependency graph in which a subgraph, representing a portion of the dependency graph, is represented by a first multidimensional vector having first respective values of dimensions of the embedding space, resulting in the first multidimensional vector representing different properties of the software components;
receiving a query comprising an anomaly pattern indicative of a portion of the nodes and the edges arranged in a manner determined to be problematic for operation of the cloud services platform;
converting the anomaly pattern to a second multidimensional vector of the embedding space; and
determining that the anomaly pattern exists in the dependency graph when the first multidimensional vector comprises first respective values of the dimensions that are greater than associated second respective values of the dimensions for the second multidimensional vector.

16. The non-transitory computer-readable medium of claim 15, wherein the anomaly pattern is an anti-pattern that occurs during the run time execution of the microservices.

17. The non-transitory computer-readable medium of claim 16, wherein the anti-pattern is at least one of a cyclical dependency pattern, a knot pattern, a bottleneck pattern, a size discrepancy pattern, or a service knot pattern.

18. The non-transitory computer-readable medium of claim 15, wherein the portion of the dependency graph represented by the subgraph comprises a decomposition of the dependency graph as a first node of the nodes and only others of the nodes and the edges that are within two hops of the first node.

19. The non-transitory computer-readable medium of claim 15, wherein the converting of the anomaly pattern to the second multidimensional vector comprises selecting a pattern node of the anomaly pattern as an anchor point and embedding the anchor point into the embedding space.

20. The non-transitory computer-readable medium of claim 15, wherein the operations further comprise classifying the nodes of the dependency graph or the edges of the dependency graph according to a graph spatial analysis of relationships between the software components.

* * * * *